(12) United States Patent
Huang (10) Patent No.: US 11,403,281 B2
(45) Date of Patent: Aug. 2, 2022

(54) PARALLEL BLOCKCHAIN PROCESSING

(71) Applicant: Digital Transaction Limited, Hong Kong (CN)

(72) Inventor: Ian Yuan Yuan Huang, Hong Kong (CN)

(73) Assignee: Eternal Paradise Limited, Mahe (SC)

( * ) Notice: Subject to any disclaimer, the term of this patent is extended or adjusted under 35 U.S.C. 154(b) by 81 days.

(21) Appl. No.: 16/739,083

(22) Filed: Jan. 9, 2020

(65) Prior Publication Data
US 2021/0216527 A1    Jul. 15, 2021

(51) Int. Cl.
*G06F 16/23* (2019.01)
(52) U.S. Cl.
CPC ...... *G06F 16/2365* (2019.01); *G06F 16/2379* (2019.01)
(58) Field of Classification Search
CPC .. G06F 16/2365; G06F 16/2379; G06F 16/23; H04L 9/3239; H04L 63/123; H04L 2209/38
See application file for complete search history.

(56) References Cited

U.S. PATENT DOCUMENTS

| | | | | |
|---|---|---|---|---|
| 7,620,680 | B1 * | 11/2009 | Lamport | H04L 63/1441 709/201 |
| 9,774,578 | B1 * | 9/2017 | Ateniese | H04L 63/061 |
| 11,218,313 | B1 * | 1/2022 | Raghavan | H04L 63/105 |
| 2012/0254655 | A1 * | 10/2012 | Butterworth | G06F 21/55 714/4.11 |
| 2018/0341930 | A1 * | 11/2018 | Moir | G06Q 20/3825 |
| 2019/0287099 | A1 * | 9/2019 | Tan | G06F 16/2379 |
| 2020/0014745 | A1 * | 1/2020 | Thurimella | H04L 63/0428 |
| 2020/0059369 | A1 * | 2/2020 | Li | H04L 9/3239 |
| 2020/0074424 | A1 * | 3/2020 | Motylinski | G06Q 20/065 |
| 2020/0089791 | A1 * | 3/2020 | Raman | G06F 16/2365 |
| 2020/0162264 | A1 * | 5/2020 | Zamani | H04L 9/3297 |
| 2020/0326973 | A1 * | 10/2020 | Xie | G06F 16/2365 |
| 2020/0396081 | A1 * | 12/2020 | Ansel | H04L 9/3236 |

(Continued)

FOREIGN PATENT DOCUMENTS

CN    112116461 A  *  12/2020

OTHER PUBLICATIONS

Bob Glickstein "Understanding the Steller Consensus Protocol" https://medium.com/interstellar/understanding-the-stellar-consensus-protocol-423409aad32e Mar. 13, 2019 (Year: 2019).*

(Continued)

*Primary Examiner* — Dennis Truong
(74) *Attorney, Agent, or Firm* — Norton Rose Fulbright US LLP (57) ABSTRACT

Methods and systems are described for validating a block in a blockchain. The methods may include identifying a subset of nodes in a blockchain network as trusted nodes. The trusted nodes perform a voting process to validate a block for the blockchain, whereas those nodes that are not identified as trusted nodes may not engage in the validation process. The trusted nodes may be identified based on past participation in the blockchain, stake in the blockchain, based on an organization operating the node, or other factors. In some cases the trusted nodes may be grouped into one or more voting quorums, and quorum management software may direct the validation process.

14 Claims, 6 Drawing Sheets

(56) References Cited

U.S. PATENT DOCUMENTS

| | | | |
|---|---|---|---|
| 2021/0004777 A1* | 1/2021 | Kim | G06Q 20/40 |
| 2021/0021424 A1* | 1/2021 | Punal | H04L 9/3236 |
| 2021/0026840 A1* | 1/2021 | Chen | G06F 16/2365 |
| 2021/0174343 A1* | 6/2021 | Aggarwal | H04L 9/3239 |

OTHER PUBLICATIONS

Carrara, Gabriel R., et al. "Consistency, availability, and partition tolerance in blockchain: a survey on the consensus mechanism over peer-to-peer networking." Annals of Telecommunications 75.3 (2020): 163-174. (Year: 2020).*

J. Sousa, A. Bessani and M. Vukolic, "A Byzantine Fault-Tolerant Ordering Service for the Hyperledger Fabric Blockchain Platform," 2018 48th Annual IEEE/IFIP International Conference on Dependable Systems and Networks (DSN), 2018, pp. 51-58, doi: 10.1109/DSN.2018.00018. (Year: 2018).*

* cited by examiner

PARALLEL BLOCKCHAIN PROCESSING

FIELD

The following relates generally to blockchain technology, and more specifically to parallel processing of a blockchain network.

BACKGROUND

Blockchain technology is a decentralized, distributed data management technology that enables a collaborative, trusted working environment for a network of computers to work together. The blockchain can be thought of as a distributed electronic ledger that stores a list of transactions and records between participants. The data are stored in blocks and every block, except for the first block, is linked to a prior block to form a chain. This chain is replicated to every computer nodes or intelligent node of all the participants. Encryption technology is employed so that if any block is tampered, all the participants can detect it.

A validation request may be initiated by all participants at any time. While this is typically made before a new block is added to the chain, there may be other occasions that a participant may request to validate the whole chain. Validation may include verifying that a hash value for the block is consistent with the data within the block. In some cases, each node in the system participates in the validation. After a node validates a block, it may broadcast its result to all other nodes, and wait until it receives results of all other blocks. In such a system, a node only confirms the validity of the block when it receives verification from every other node. This may result in a significant amount of network communication overhead, which may use valuable system resources and potentially cause significant delays.

SUMMARY

Methods and systems are described for validating a block in a blockchain network. A blockchain network may include one, multiple or many blockchains being processed in parallel. Each of the blockchain may be processed in the method described independently and in parallel to other blockchains' processing. The methods may include receiving at least one request by the blockchain network, instructing the blockchain network to validate a block. The method first identifies a subset of nodes in the blockchain network as trusted nodes. The trusted nodes must meet certain pre-determined criteria. It then forms a quorum that comprises a plurality of trusted nodes as quorum members. The quorum has a quorum manager to coordinate the validation activities. It first distributes the validation request to each quorum member and receives a vote on the validity of the block from each quorum member. It then determines the validity of the block by tallying up the voting results.

A method for interacting with a blockchain is described. The method may include identifying a block to be added to a blockchain, identifying a plurality of nodes participating in the blockchain, identifying a plurality of trusted nodes from the plurality of nodes, transmitting the block to each of the plurality of trusted nodes, receiving a validity vote from each of the trusted nodes in response to transmitting the block, and determining a validity of the block based at least in part on the validity vote from each of the trusted nodes.

A system for interacting with blockchains is described. The system may include at least one processor, at least one memory in electronic communication with the processor, and instructions stored in the memory. The instructions may be operable to cause the at least one processor to identify a block to be added to a blockchain, identify a plurality of nodes participating in the blockchain, identify a plurality of trusted nodes from the plurality of nodes, transmit the block to each of the plurality of trusted nodes, receive a validity vote from each of the trusted nodes in response to transmitting the block, and determine a validity of the block based at least in part on the validity vote from each of the trusted nodes.

DETAILED DESCRIPTION

In some cases, a validation process for a blockchain is slow, or consumes a lot of computing power because all nodes participating in the blockchain participate in validation. For example, after a node validates a block, it will broadcast the result to all other nodes and wait until it receives results from all the other nodes. Only when it receives all the results does it confirm the validity of the block in question. This process may incur a tremendous amount of network communication and processing overhead, which may result in overloading the network and increasing waiting times.

Thus, in some examples it may be appropriate for a subset of nodes, known as trusted nodes, to engage in validation. The trusted nodes may validate blocks in the blockchain concurrently, and then proceed to the next block.

In one example described herein, the trusted nodes are organized into quorums, and may be known as quorum members. Thus, a blockchain may have at least two categories of members: basic nodes and trusted nodes. In some examples, the nodes can be operated by authoritative entities such as government organizations. If their trustworthiness is high, certain nodes may be permanent trusted nodes. In other examples, trusted nodes can be voted in as members of a quorum, either permanently or for a limited period of time. A quorum may identify (e.g., elect) a quorum manager to administer voting processes such as validation, and in some cases, electing new quorum members. In yet another example, the trusted nodes can be identified by lottery.

Thus, in some examples a trusted node is identified as a trusted node for a specific term. Afterwards, a new trusted node may be identified to replace the expiring node. In some cases, the trusted nodes are anonymous to each other. In some cases, trusted nodes identify the trustworthiness of other nodes based on past voting behavior.

Once a set of trusted nodes is identified, the trusted nodes may perform a validation process. For example, blocks may be validated to determine whether a hashcode is consistent with data in the block and/or previous blocks. In one embodiment, each trusted node declares a block valid or invalid. The number of trusted nodes in a quorum may be restricted to odd numbers so that a majority vote may determine the validity of a block. If a block is declared invalid, a quorum manager ask other nodes (i.e., nodes that are not in the quorum) to validate the block. Additionally or alternatively, a higher threshold for validation may be established after a failed vote. If the block is still invalid, the result may be reported to the creator of the block. In some cases, the block creator may identify and fix the problem. The existing block may remain invalid, and a new block may be created and appended to the chain subject to a new validation process (which may be more stringent than the original process for that block).

In some cases, a quorum may identify a quorum manager. The quorum manager may be elected by the quorum members, or may be selected by a random process such as a lottery. The quorum manager may serve for a predetermined period of time. One role of the quorum manager may be to consolidate the validation results of quorum members and declare whether a block is valid or invalid.

In some cases, trusted nodes choose to participate to a quorum by themselves. After the quorum is formed, a quorum manager is assigned. In some cases, the quorum manager is randomly chosen. In other cases, members of the quorum elects a quorum manager by voting.

In other cases, all the trusted nodes form a pool. New quorums are formed by recruiting its members from the pool. In some cases, this is done by a randomized lottery process. Thus quorum members may be different in every quorum. In other cases, quorum members are voted in by the trusted nodes in the pool.

In some cases a quorum may be terminated. For example, in some embodiments a quorum may be automatically terminated after all of the blocks in the blockchain are verified as valid. Also, if an invalid block is found, the quorum may still be terminated and the invalid block may be subject to further investigation, i.e., through auditing the data log.

In one example, given a blockchain with N blocks and a network with M nodes, if every node validates each block, there may be M*N validation computations. If all nodes are working in parallel this may take N processing cycles. Each node may broadcast to (M−1) other nodes and may receive (M−1) messages during each cycle.

However, if a quorum has m trusted nodes (m is odd and m<<M), the quorum may make a decision if $$\left(\frac{m}{2}+1\right)$$

nodes agree. The number of validation computations may be $$\left(\frac{m}{2}+1\right)*N.$$

The elapse time, if all the trusted nodes operate in parallel may be N cycles. Each node may broadcast to $$\frac{m}{2}$$

other nodes and may receive at most $$\frac{m}{2}$$

reply messages during each cycle.

In this example, the number of nodes that can perform a validation may be as few as $$\left(\frac{m}{2}+1\right)$$

(i.e., in order to achieve a majority for validation). But each of these nodes would have to validate unanimously. In some examples, the set of trusted nodes can be partitioned into (m1, m2, . . . mk) groups, where group m1 can validate a first block and group m2 can validate a second block. That is, different quorums can validate different blocks in parallel to speed up validation. In this example, the number of cycles could be reduced to $$\frac{N}{k}.$$

In some examples, more than one quorum can be formed at any given time. Each quorum may validate different blocks in the chain. This parallel processing may result in a reduced delay in performing the validation process.

In one embodiment, when there are N blocks to be verified, and K quorums are formed to validate them in parallel, a coordinate node is created to coordinate the activities of these K quorums. The coordinate node may be a trusted node. It will receive the validation results from the K quorums. If all the N blocks are verified independently by the K quorums, then they are all accepted as valid blocks. If the $n^{th}$ block is not verified (the validation result is negative), then the $(n-1)^{th}$ to N blocks are all considered invalid. In this case, the coordinate node issues a stop-validation instruction to all the K quorums to stop verifying $(n-1)^{th}$ to N blocks. As such, computation time can be saved when an invalid block is found.

In one embodiment, a trusted node can only participate in one quorum. In other embodiments, a trusted node may participate to more than one quorum concurrently. As such, the trusted node may perform validation on more than one requests simultaneously.

In some embodiments, trusted nodes may automatically become quorum members. However, if the number of trusted nodes exceeds a threshold, a trusted node may be prompted regarding whether they want to join a quorum. Non-trusted nodes may go through another level of query to determine whether they satisfy certain requirements for becoming a trusted node. For example, it may be determined whether the node's computing equipment is sufficiently secured, or whether the node has sufficient computing resources (e.g., memory and speed) to perform validation. If they satisfy a set of pre-determined requirements, the node may be elected or appointed as quorum member. In some examples, quorum members may store the entire blockchain and do the validation on their local machine, and the results of validation procedures may be broadcast to other quorum members.

Figure 1:
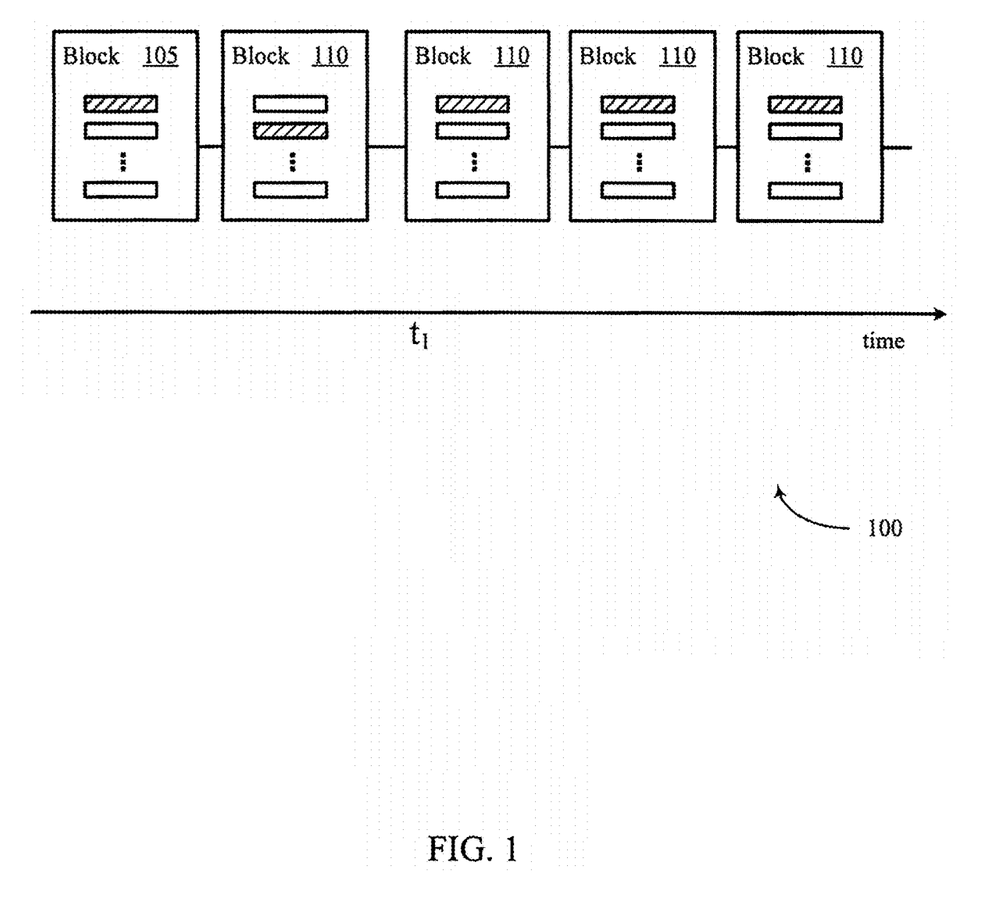
FIG. 1 shows an example of a blockchain in accordance with aspects of the present disclosure.

FIG. 1 shows an example of a blockchain 100 in accordance with aspects of the present disclosure. Blockchain 100 may be an example of, or include aspects of, the corresponding elements described with reference to FIG. 2. Blockchain 100 may include genesis block 105 and block 110.

A blockchain 100 may be a trusted, traceable, and immutable system through a peer-to-peer network. The blockchain 100 chain comprises a genesis block 105, which is the first block of the chain, and subsequent blocks 110 that are linked to the previous blocks 110 to form the chain. In one embodiment, each block 110 comprises a plurality of fields such as a block ID, a time stamp that records the time that this block 110 is created, a hash value of the previous block 110, a data packet and a digital signature which, in one implementation is a hash value of the entire block 110. In a further embodiment, the data packet comprises a plurality of fields and its actual content depends on applications. For example, in a crypto-currency application, the data packet may consist of fields like 'From', 'To' and 'Amount', etc. In yet another embodiment, a flag is associated with each data field. It indicates the importance of this field.

As the hash value may be a hash of the previous block 110, the integrity of the entire chain is guaranteed. That is, if a user tampers with the data packet in one of the block 110, its digital signature will be changed. Thus, the hash value of subsequent blocks 110 will not match with their stored values, causing the subsequent blocks 110 to be invalid. Since the same blockchain 100 is replicated to all other computer nodes within the network, unless the user can make the same alternation on all other chains in a short time, his action will be easily detected. Thus, rather than keeping information in one central point, as is done by traditional recording methods, multiple copies of the same data are stored in different locations and on different devices on the network, through a peer to peer (P2P) network. This means that even if one point of storage is damaged or lost, multiple copies remain safe and secure elsewhere. Similarly, if one piece of information is changed without the agreement of the rightful owners, there are countless other examples in existence, where the information is true, making the false record obsolete. It is this act of linking blocks 110 into a chain that makes the information stored on the blockchain 100 so trustworthy.

Figure 2:
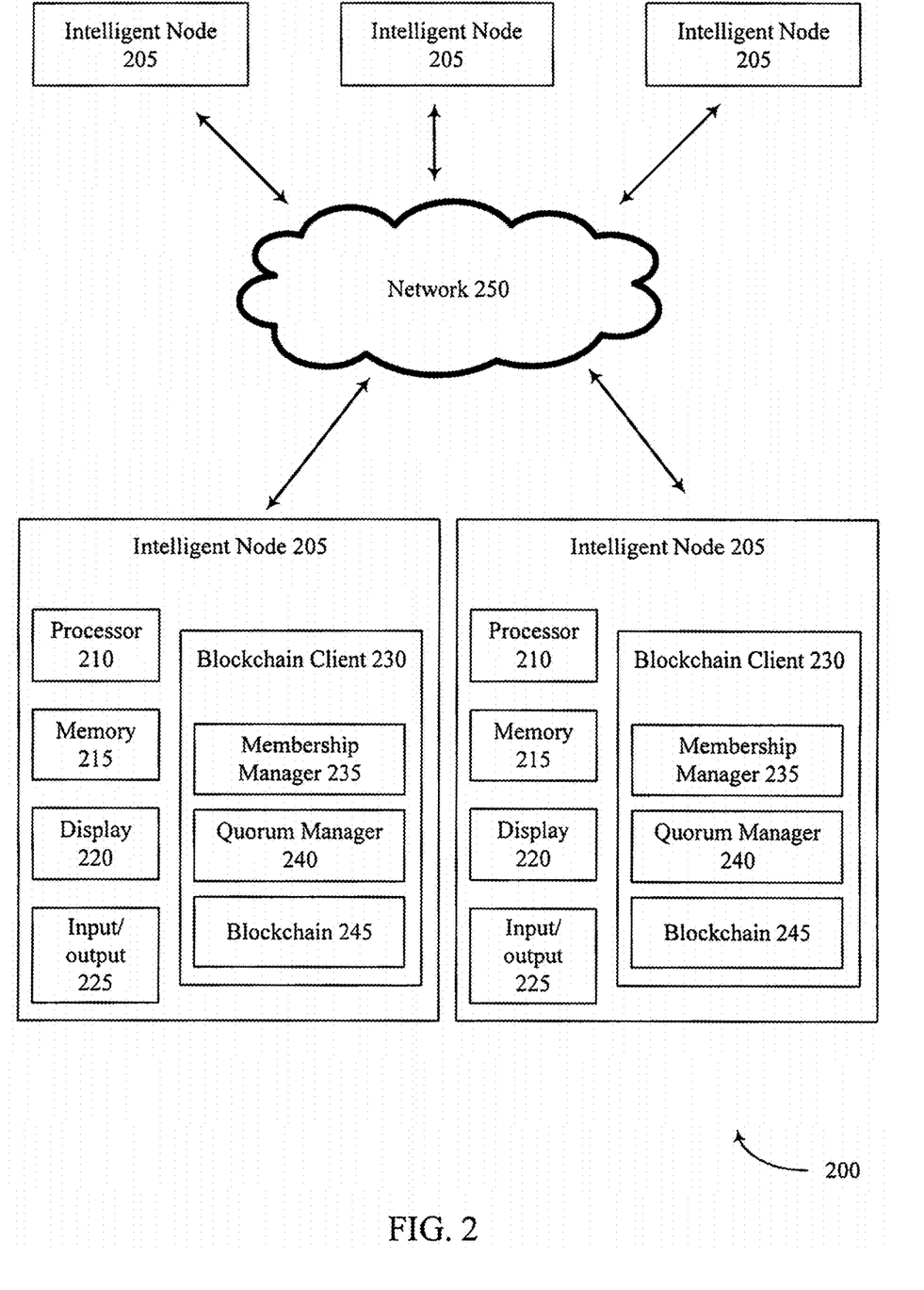
FIG. 2 shows an example of a blockchain system in accordance with aspects of the present disclosure.

FIG. 2 shows an example of a blockchain system 200 in accordance with aspects of the present disclosure. Blockchain system 200 may be an example of, or include aspects of, the corresponding elements described with reference to FIG. 3. Blockchain system 200 may include intelligent nodes 205 and network(s) 250.

That is, a blockchain system 200 may include a plurality of intelligent nodes 205 interconnected via one or more networks 250. The networks 250 can be one or more computer networking technologies such as the Internet, an intranet, an extranet, a cellular network, a local area network (LAN), a home area network (HAN), metropolitan area network (MAN), a wide area network (WAN), a Bluetooth network, public and private networks 250, etc.

For each intelligent node 205 participating in this blockchain system 200, a user can download and install a blockchain client 230. The blockchain client 230 may be software that includes components such as a membership manager 235, a quorum manager 240, and a blockchain 245. The membership manager 235 manages the trustworthiness of the participants. The quorum manager 240 controls the voting process among the quorum members.

In some cases, the blockchain system 200 may be a distributed system. Many computers or intelligent nodes 205 can connect to the blockchain system 200 through the network 250 and each intelligent node 205 has a full copy of the chain. While the quorum manager 240 comes with the blockchain client 230 and is installed in each of the participating intelligent node 205, it may not be in use unless the user of this intelligent node 205 is a quorum member. Similarly, the membership manager 235 may not be invoked if the user does not want to participate in determining the trustworthiness of other members.

By way of an example, the blockchain 245 technology discussed herein can play its role in streamlining the logistics and transportation industry. The blockchain 245 can enable participants to automate information collection and process through smart contracts with a lower overall cost due to faster transactions.

Intelligent node 205 may be one of a plurality of basic nodes, wherein the plurality of basic nodes are configured to refrain from participating in a block voting process. In an example embodiment, the intelligent node 205 can be one or more computers, smart phones or tablets. Intelligent node 205 may include processor 210, memory 215, display 220, input/output 225, and blockchain client 230. Blockchain client 230 may include membership manager 235, quorum manager 240, and blockchain 245. Blockchain 245 may be an example of, or include aspects of, the corresponding elements described with reference to FIG. 1.

Membership manager 235 may perform the following functions: identifying a plurality of nodes participating in a blockchain 245; determining that a node from the plurality of nodes is a trusted node; adding the node to a list of trusted nodes; and determining that the node is operated by a trusted organization, wherein determining that the node is a trusted node is based at least part on the determination that the node is operated by the trusted organization.

Membership manager 235 may also perform the following functions: determining that the node is a permanent trusted node based at least part on the determination that the node is operated by the trusted organization; determining that a tenure for the node has expired; removing the node from the list of trusted nodes based on the expiration of the tenure; and identifying a new trusted node based at least in part on removing the node from the list of trusted nodes.

Quorum manager 240 may also perform the following functions: determining that the block is valid based on the determination that each validity vote indicates the block is valid; adding the block to the blockchain 245 based on the determination that the block is valid; determining that the block is valid based on the determination that the voting score is above the threshold and adding the block to the blockchain 245 based on the determination that the block is valid. The voting score (VS) may be calculated based on a number of votes indicating the block is valid (V) and a number of votes indicating the block is invalid (I). For example, the voting score may be calculated based on a difference between V and I (e.g., VS=V−I) or based on a ratio of V and I (e.g., VS=V/I). Once the voting score has been calculated, the voting score may be compared to the above-mentioned threshold to determine whether the block is valid. The threshold may be configured to a particular value based on the particular technique used to calculate the voting score. For example, where VS is calculated based on the difference between V and I, the threshold may be configured to have a value of 0 such that when VS<0 the block is determined to be invalid (e.g., VS=V−I<0 or the number of votes indicating the block is invalid exceeds the number of votes indicating the block is valid) and when VS<0 the block is determined to be invalid (e.g., VS=V−I>0 or the number of votes indicating the block is valid exceeds the number of votes indicating the block is invalid). If VS is calculated as the ratio of V and I the threshold may be configured to have a value of 1 such that when VS<1 the block is determined to be invalid (e.g., VS=V/I<1 or the number of votes indicating the block is invalid exceeds the number of votes indicating the block is valid, such as V=5, I=7, VS=−2 or there were two more votes indicating the block was invalid than votes indicating the block was valid) and when VS<0 the block is determined to be invalid (e.g., VS=V−I>0 or the number of votes indicating the block is valid exceeds the number of votes indicating the block is invalid, such as V=15, I=10, VS=1.5 or there were 1.5 times more votes indicating the block was valid than votes indicating the block was invalid). It is noted that the exemplary techniques for calculating the voting score and configuring the threshold used to determine whether a block is valid based on the voting score have been provided for purposes of illustration, rather than by way of limitation and other techniques may be utilized to calculate voting scores and configure appropriate threshold in accordance with aspects of the present disclosure.

Quorum manager 240 may also perform the following functions: determining that the block is not valid based at least in part on the validity votes received from each of the plurality of trusted nodes; refraining from adding the block to the blockchain 245 based on the determination that the block is not valid; and identifying a second plurality of trusted nodes.

Quorum manager 240 may also perform the following functions: determining that the block is valid based on the determination that each validity vote indicates the block is valid; adding the block to the blockchain 245 based on the determination that the block is valid; determining that the block is valid based on the determination that the voting score is above the threshold and adding the block to the blockchain 245 based on the determination that the block is valid.

Quorum manager 240 may also perform the following functions: determining that the block is not valid based at least in part on the validity votes received from each of the plurality of trusted nodes; refraining from adding the block to the blockchain 245 based on the determination that the block is not valid; and identifying a second plurality of trusted nodes.

Quorum manager 240 may also perform the following functions: transmitting the block to each of the second plurality of trusted nodes based on the determination that the block is not valid; receiving a second validity vote from each of the second plurality of trusted nodes in response to transmitting the block to each of the second plurality of trusted nodes; determining the validity of the block based at least in part on the second validity vote from each of the second plurality trusted nodes; and transmitting a message to a block creator of the block indicating that the block is invalid.

Quorum manager 240 may perform a validation process for a block of the blockchain 245 based at least in part on the list of trusted nodes; performing a voting process among the plurality of nodes, wherein determining that the node is the trusted node is based at least part on the voting process; and identifying a plurality of trusted nodes.

Quorum manager 240 may also perform a voting process among the plurality of trusted nodes, wherein determining that the node is the trusted node is based at least part on the voting process. It also performs a randomized lottery, wherein determining that the node is a trusted node is based at least part on the randomized lottery.

In some examples, a threshold for the second validity vote is higher than a threshold for the first validity vote. In some examples, the voting process is based at least in part on a participation record of the node.

Figure 3:
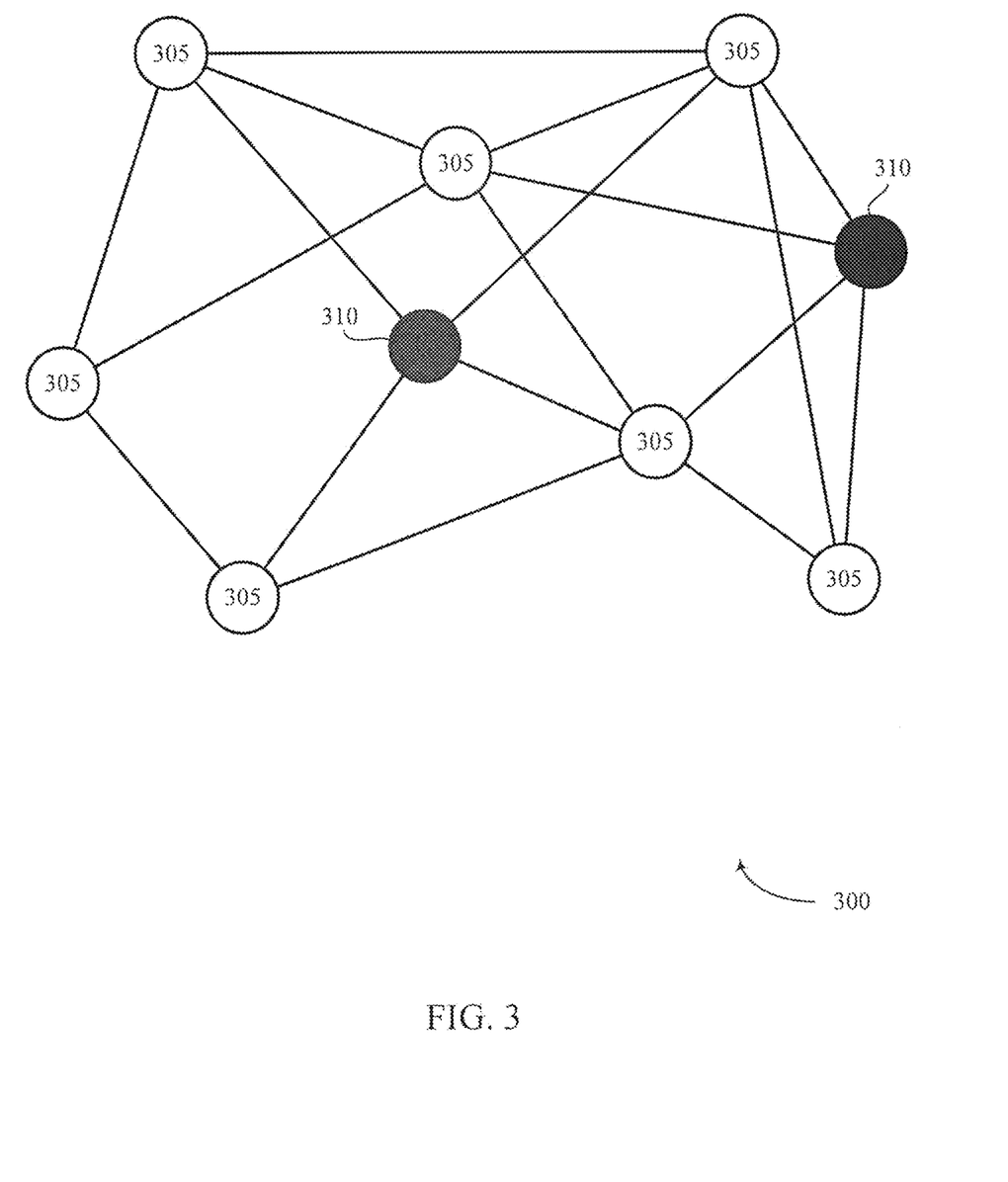
FIG. 3 shows an example of a blockchain system including trusted nodes in accordance with aspects of the present disclosure.

FIG. 3 shows and example of a blockchain system 300 including trusted nodes 310 in accordance with aspects of the present disclosure. Blockchain system 300 may be an example of, or include aspects of, the corresponding elements described with reference to FIG. 2. Blockchain system 300 may include nodes 305 and trusted nodes 310.

Nodes 305 may be computer nodes that participate in the blockchain network. Each node 305 installs a blockchain client software that can download the entire blockchain or a portion of the blockchain. Depending on the application domain, each block records a transaction such as payments or event tracking in a supply chain. Users can check all of the transactions and hash values in each block of the blockchain, and if any attempt to change anything on any of the block is made, the hash values will change, and the verification will fail. Thus, no central authority is required to monitor or control the validity of these events. The blockchain thus forms an immutable record.

When a new transaction is made in any of the computer nodes 305, a new block containing the data of that transaction is made. Before this block can be added to the chain, a process known as validation needs to take place. Validation may satisfy certain predefined criteria before a block can be appended to the chain. Validation methods include Proof-of-Work and Proof-of-Stake procedures. However, in some cases these methods demand substantial computation resources. Furthermore, if every participating node 305 in the network must process every transaction and maintain a copy of the entire state, this limits the testability and usability of the blockchain. As the size of the blockchain grows, the requirements for storage, bandwidth, and compute power may also increase.

Thus, some blockchain systems 300 include methods to reduce computational complexity. For example, in one embodiment of the present disclosure, the validation process is determined by a subset of nodes 305 referred to as a quorum. That is, a subset of the computer nodes 305 are designated as trusted nodes 310, or quorum members, that engage in the validation process.

When a new transaction is made, each quorum member can independently examine the new transaction and cast a vote to certify its validity. When the number of valid votes is higher than a predetermined threshold, or the vote satisfies some alternative condition, the quorum declares the new transaction valid and a new block is added to the chain.

In one embodiment, the threshold is set to be one larger than half of the total quorum members. In a further embodiment, when the number of valid votes happens to be the same as that of invalid votes, a tie is declared. In one embodiment, the transaction can be simply rejected. In another embodiment, the quorum members are asked to vote again. But this time a higher threshold is used. In an embodiment, the higher threshold is 75% of the total number of quorum members. If the second round also ends up with a tie vote, then a new round is called for with an even higher threshold. This process is repeated until a tie is broken or the maximum number of repeating reaches and hence the transaction is rejected.

Adding new blocks under the quorum mechanism may increase speed relative to alternative blockchain technologies since the number of quorum members may be much less than the total number of participants in the blockchain application. Moreover, since all the quorum members are regarded as trusted members, there is no need to employ elaborated, computationally expensive method to guard against possible collusion or other faults.

Trusted node 310 may be configured to participate in a block voting process. In some examples, the plurality of trusted nodes 310 are organized into one or more trusted node quorums, wherein the block voting process includes the participation of each node in one of the trusted node quorums.

Figure 4:
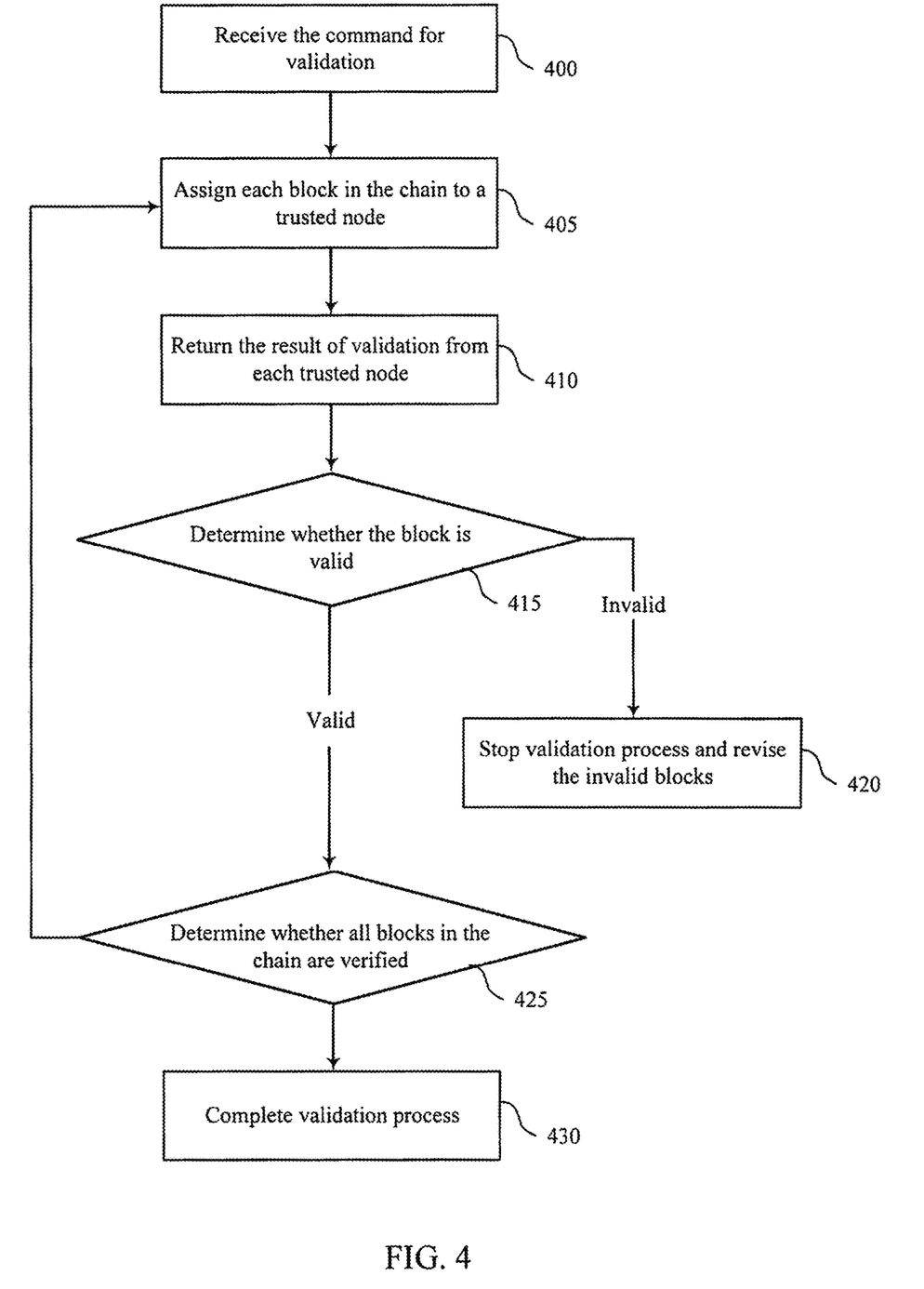
FIG. 4 is a flow diagram illustrating aspects of an exemplary process of validating a block of a blockchain in accordance with aspects of the present disclosure.

FIG. 4 shows and example of a process of validating a block of a blockchain in accordance with aspects of the present disclosure.

At step 400, a system may receive the command for validation.

At step 405, the system may assign each block in the chain to a trusted node.

At step 410, the system may return the result of validation from each trusted node.

At step 415, the system may determine whether the block is valid. If the block is valid, the process may proceed to step 425. Otherwise the process may proceed to step 420.

At step 420, if the block is invalid, the system may stop validation process and revise the invalid blocks.

At step 425, the system may determine whether all blocks in the chain verified. If all the blocks are valid, the process may proceed to step 430 (complete the validation At step 410, the system may return the result of validation from each trusted process). Otherwise the process may return to step 405.

At step 430, the system may complete validation process.

In some cases, the operations of steps 400, 405, 410, 415, 420, 425 and 430 may be performed by a quorum manager as described with reference to FIG. 2.

Figure 5:
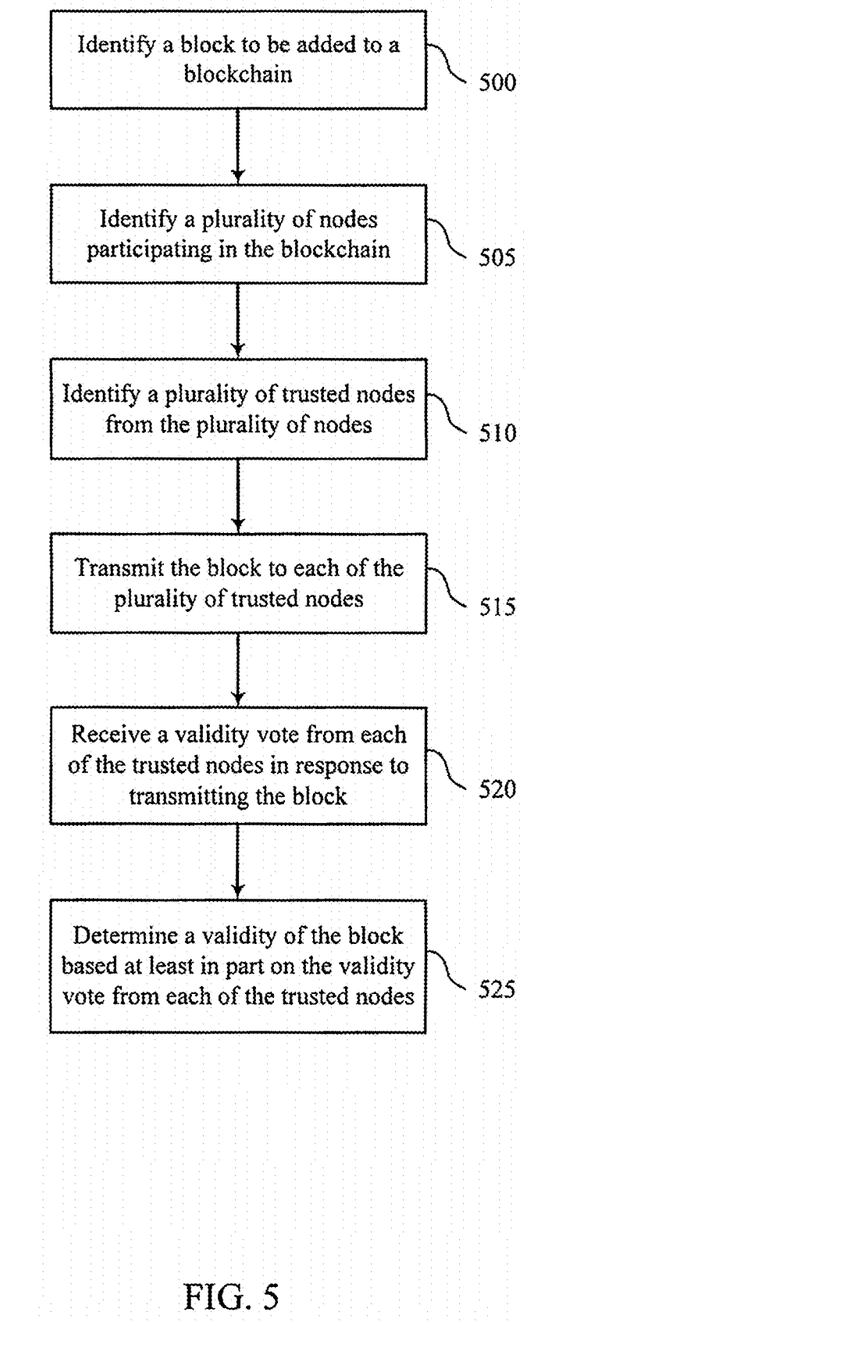
FIG. 5 is a flow diagram illustrating aspects of an exemplary process of validating a block of a blockchain in accordance with aspects of the present disclosure.

FIG. 5 shows and example of a process of validating a block of a blockchain in accordance with aspects of the present disclosure.

At step 500, a system may identify a block to be added to a blockchain.

At step 505, the system may identify a plurality of nodes participating in the blockchain.

At step 510, the system may identify a plurality of trusted nodes from the plurality of nodes.

At step 515, the system may transmit the block to each of the plurality of trusted nodes.

At step 520, the system may receive a validity vote from each of the trusted nodes in response to transmitting the block.

At step 525, the system may determine a validity of the block based at least in part on the validity vote from each of the trusted nodes.

In some cases, the operations of steps 500, 505, 510, 515, 520 and 515 may be performed by a quorum manager as described with reference to FIG. 2.

Figure 6:
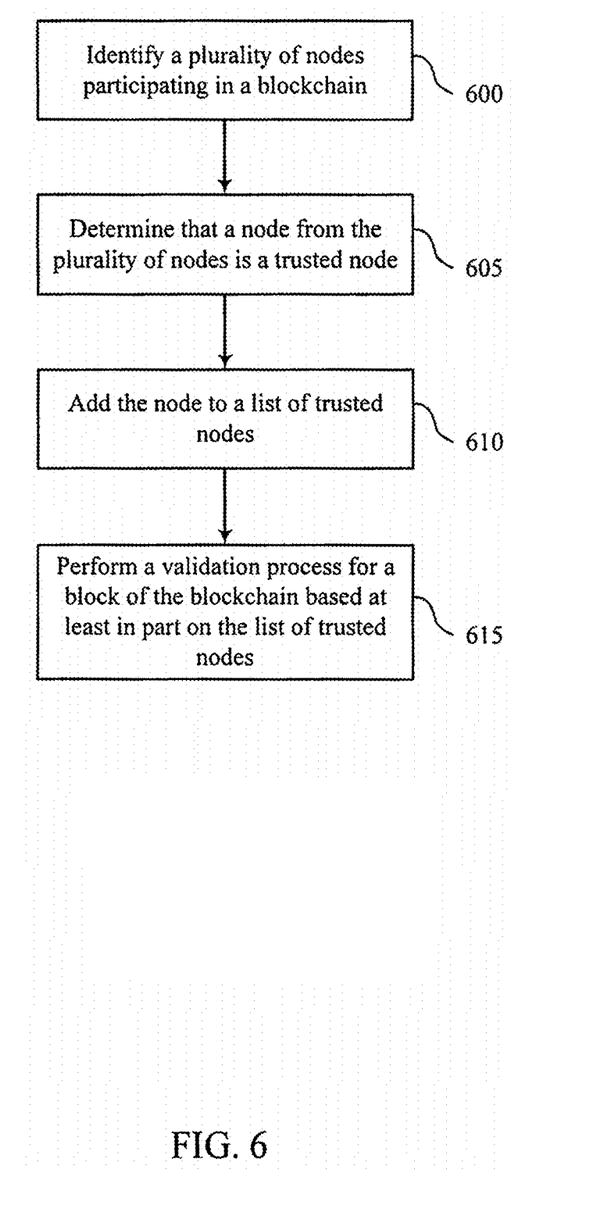
FIG. 6 is a flow diagram illustrating aspects of an exemplary process of validating a block of a blockchain in accordance with aspects of the present disclosure.

FIG. 6 shows and example of a process of validating a block of a blockchain in accordance with aspects of the present disclosure.

At step 600, a system may identify a plurality of nodes participating in a blockchain.

At step 605, the system may determine that a node from the plurality of nodes is a trusted node.

At step 610, the system may add the node to a list of trusted nodes.

At step 615, the system may perform a validation process for a block of the blockchain based at least in part on the list of trusted nodes.

In some cases, the operations of steps 600, 605, 610 and 615 may be performed by a quorum manager as described with reference to FIG. 2.

In some examples, the operations described in FIGS. 4, 5 and 6 may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method of validating a block in a blockchain network, comprising the steps of:
   receiving at least one validation request, by the blockchain network, the at least one validation request instructing the blockchain network to validate a block;
   identifying a subset of nodes in the blockchain network as trusted nodes;
   establishing a quorum formed from a first plurality of trusted nodes of the trusted nodes, the first plurality of trusted nodes participating in the quorum as quorum members, wherein the quorum comprises a quorum manager;
   distributing, by the quorum manager, the validation request to each quorum member;
   receiving, by the quorum manager, a vote on the validity of the block from each quorum member; and
   determining, by the quorum manager, the validity of the block by tallying up the votes received;
   identifying a second plurality of trusted nodes;
   transmitting the block to each of the second plurality of trusted nodes based on a determination, by the quorum, that the block is not valid;
   receiving a second validity vote from each of the second plurality of trusted nodes in response to transmitting the block to each of the second plurality of trusted nodes; and
   determining the validity of the block based at least in part on the second validity vote from each of the second plurality trusted nodes, wherein a threshold for the second validity vote is higher than a threshold used by the quorum in the determination that the block is not valid,
   wherein a trusted node must meet certain pre-determined criteria, and
   wherein a node is a computing device that comprises a processor and a memory that stores an entire blockchain of the blockchain network.

2. The method of claim 1, further comprising the steps of:
   receiving validation requests to verify a plurality of blocks; and
   forming multiple quorums, each quorum handling a unique validation request of the received validation requests.

3. The method of claim 2, wherein a coordinator node coordinates activities of said multiple quorums, further comprising the steps of:
   receiving, by the coordinator node, validation results as and when a particular quorum of said multiple quorums completes the validation request;
   declaring, by the coordinator node, all blocks are valid when all quorum managers verify that all the blocks are valid; and
   declaring, by the coordinator node, that an $(n-1)^{th}$ block to a last block of the plurality of blocks to be invalid if an $n^{th}$ block is found to be invalid by one of said multiple quorums, and sending a stop-validation instruction to all the said multiple quorums to stop validating from the $(n-1)^{th}$ block to the last block.

4. The method of claim 2, wherein the quorum will dissolve after it determines the validity of the block.

5. The method of claim 2, wherein the trusted nodes forms a pool and the quorum is formed by performing randomized lottery on the trusted nodes in the pool.

6. The method of claim 2, wherein the trusted nodes forms a pool and the quorum is formed by performing voting process by the trusted nodes in the pool.

7. The method of claim 1, further comprising:
   determining that the node is operated by a trusted organization, wherein determining that the node is a trusted node is based at least part on the determination that the node is operated by the trusted organization.

8. The method of claim 7, further comprising:
   determining that the node is a permanent trusted node based at least part on the determination that the node is operated by the trusted organization.

9. A method for interacting with a blockchain, the method comprising:
   identifying a block to be validated to a blockchain;
   identifying a plurality of nodes participating in the blockchain;
   identifying a first plurality of trusted nodes from the plurality of nodes;
   establishing a quorum based on the first plurality of trusted nodes, the first plurality of trusted nodes participating in the quorum as quorum members, wherein the quorum comprises a quorum manager;
   transmitting the block to each of the first plurality of trusted nodes;
   receiving a validity vote from each of the first plurality of trusted nodes in response to transmitting the block;
   determining a validity of the block based at least in part on the validity vote from each of the first plurality of trusted nodes;
   identifying a second plurality of trusted nodes from the plurality of nodes;
   transmitting the block to each of the second plurality of trusted nodes based on a determination, by the quorum, that the block is not valid;
   receiving a second validity vote from each of the second plurality of trusted nodes in response to transmitting the block to each of the second plurality of trusted nodes; and
   determining the validity of the block based at least in part on the second validity vote from each of the second plurality trusted nodes, wherein a threshold for the second validity vote is higher than a threshold used by the quorum in the determination that the block is not valid.

10. The method of claim 9, further comprising:
    determining that a node from the plurality of nodes that is not among the plurality of trusted nodes; and refraining from transmitting the block to the node based on the determination that the node is not among the plurality of trusted nodes.

11. The method of claim 9, further comprising:
determining that a voting score based on the validity votes received from the plurality of trusted nodes is above a threshold; and
determining that the block is valid based on the determination that the voting score is above the threshold.

12. The method of claim 9, further comprising:
determining that the block is not valid based at least in part on the validity votes received from each of the plurality of trusted nodes.

13. The method of claim 9, further comprising:
transmitting a message to a block creator indicating that the block is invalid, wherein the block is created by the block creator.

14. A system for interacting with at least one blockchain, comprising:
  at least one processor and at least one memory storing instructions and in electronic communication with the processor, the at least one processor being configured to execute the instructions to:
    identify a block to be validated to a blockchain;
    identify a plurality of nodes participating in the blockchain;
    identify a first plurality of trusted nodes from the plurality of nodes;
    establish a quorum based on the first plurality of trusted nodes, the first plurality of trusted nodes participating in the quorum as quorum members, wherein the quorum comprises a quorum manager;
    transmit the block to each of the first plurality of trusted nodes;
    receive a validity vote from each of the first plurality of trusted nodes in response to transmitting the block;
    determine a validity of the block based at least in part on the validity vote from each of the first plurality of trusted nodes;
    identify a second plurality of trusted nodes from the plurality of nodes;
    transmit the block to each of the second plurality of trusted nodes based on a determination, by the quorum, that the block is not valid;
    receive a second validity vote from each of the second plurality of trusted nodes in response to transmitting the block to each of the second plurality of trusted nodes; and
    determine the validity of the block based at least in part on the second validity vote from each of the second plurality trusted nodes, wherein a threshold for the second validity vote is higher than a threshold used by the quorum in the determination that the block is not valid;
  wherein the at least one processor processes the at least one blockchain concurrently and independently.

* * * * *

UNITED STATES PATENT AND TRADEMARK OFFICE
CERTIFICATE OF CORRECTION

PATENT NO. : 11,403,281 B2
APPLICATION NO. : 16/739083
DATED : August 2, 2022
INVENTOR(S) : Ian Yuan Yuan Huang Page 1 of 1

It is certified that error appears in the above-identified patent and that said Letters Patent is hereby corrected as shown below:

In the Specification

At Column 9, starting at Line number 33, delete:
"At step 425, the system may determine whether all blocks in the chain verified. If all the blocks are valid, the process may proceed to step 430 (complete the validation
At step 410, the system may return the result of validation from each trusted process). Otherwise the process may return to step 405."
And replace with:
--At step 425, the system may determine whether all blocks in the chain verified. If all the blocks are valid, the process may proceed to step 430 (complete the validation process). Otherwise the process may return to step 405.--.

In the Claims

At Column 12, Claim number 3, Line number 11, delete:
"to all the said multiple quorums"
And replace with:
--to said multiple quorums--.

Signed and Sealed this
Twenty-ninth Day of November, 2022

Katherine Kelly Vidal
*Director of the United States Patent and Trademark Office*